June 26, 1962 H. L. McCOMBS ET AL 3,040,715
TWO STAGE PNEUMATIC SERVO CONTROL
Filed Dec. 24, 1958 2 Sheets-Sheet 2

INVENTORS
HOWARD L. McCOMBS
MICHAEL P. FODROCI
CARL D. HAWK
BY
Robert C. Smith
ATTORNEY 3,040,715
TWO-STAGE PNEUMATIC SERVO CONTROL
Howard L. McCombs, Michael P. Fodroci, and Carl D. Hawk, South Bend, Ind., assignors to The Bendix Corporation, a corporation of Delaware
Filed Dec. 24, 1958, Ser. No. 782,732
12 Claims. (Cl. 121—41)

This invention relates to servomechanisms and more particularly to a type of device having especial utility where the most practicable power source available is a flow of hot gases either from a combustion chamber or from the decomposition of a monopropellant.

In certain missile and rocket systems it is desired to provide control means for movable nozzles, control surfaces, etc., where substantial amounts of power must be made available and it is preferable that the most convenient source of power, e.g. the combustion gases or the products of decomposition of a monopropellant, be used to power the control means. As in all aircraft equipment, there is a significant advantage in reducing size and weight to a minimum. Where guidance is effected through radio signals or other very low level signals it will be recognized that a substantial power amplification must occur in order to produce power at the level ultimately required. While electrical signals may be amplified, the size and weight of equipment for delivering large amounts of power is such as to make it desirable to convert from electrical to pneumatic or hydraulic control at a very low power level. In some cases pneumatic input signals may be used. These also will have a low power level and so means must be provided for amplifying these signals manyfold.

Some applications contemplate the use of monopropellants such as hydrogen peroxide either as primary power generating fuels or as fuels for auxiliary power equipment. In such applications, the auxiliary power units can be supplied with the hot gases resulting from decomposition of the monopropellant, as required by the system because means are normally provided for controlling the flow of such liquid monopropellant to the gas generating chamber. A substantial consumption of monopropellant by the control system therefore occurs only when there is a demand for power.

In spite of the requirements for the use of high energy compressible gases, and for a high power amplification, such systems must be accurate and stable in operation. It is therefore an object of the present invention to provide a two-stage servomechanism operable with a source of high energy compressible fluid which is capable of very high level power amplification without undue size and weight.

It is another object of the present invention to provide a servomechanism which accomplishes the above object and which is capable of controlling comparatively large amounts of power.

It is another object of the present invention to provide a servomechanism useful with a source of high energy compressible fluid which may be successfully throttled such that substantial amounts of such fluids will be expended only when substantial power output is required.

It is another object of the present invention to provide a servomechanism operable with a source of high energy compressible fluid which cannot easily be throttled.

It is a further object to provide a servomechanism which accomplishes the above objects and which incorporates feedback structure to insure stable and accurate operation.

Other objects and advantages will become apparent from the following specification taken in connection with the accompanying drawings in which.

Figure 1:
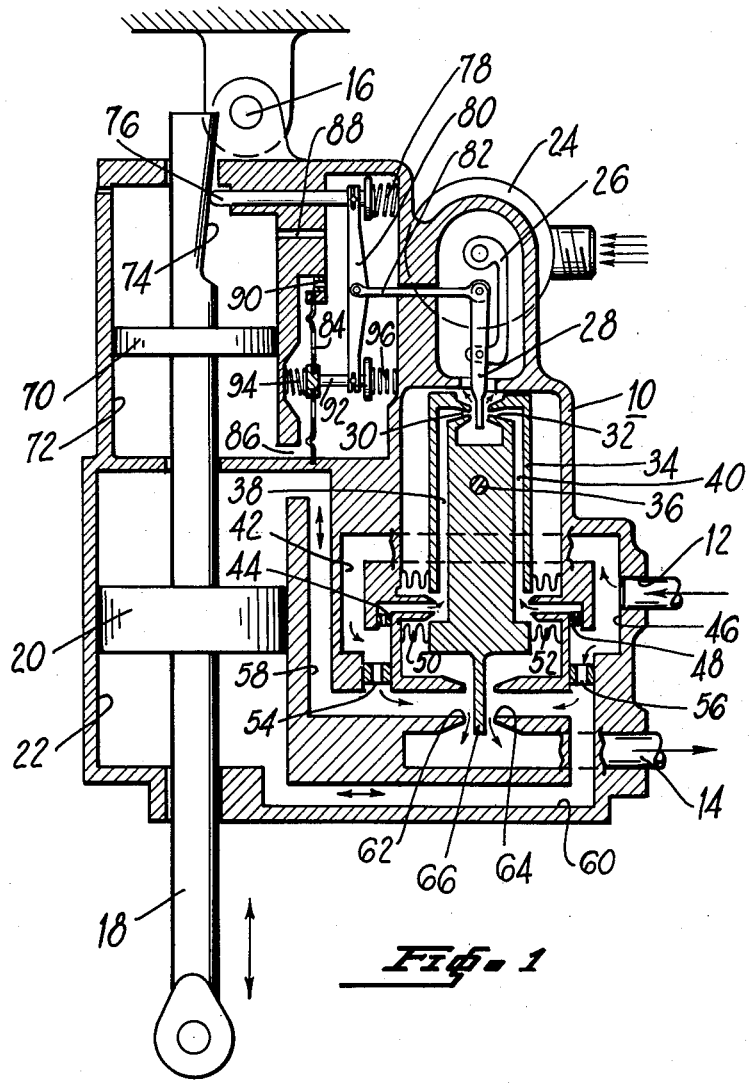
FIGURE 1 is a cross sectional view of a two-stage servomechanism embodying our invention which is operable with a continuous flow of high energy compressible fluid.

Referring now to FIGURE 1, the servomechanism is enclosed in a housing 10 having a connection 12 with a source of high energy compressible fluid which may be the gaseous products of combustion from a rocket motor. A conduit 14 carries exhaust gas from the housing 10. The housing 10 may be fastened to an air frame or the associated engine by means of a pivotal mounting 16. The output of the servomechanism is an axial movement of a shaft 18 driven by a piston 20 in a cylinder 22. The input signals to the servomechanism 10 are delivered to a torque motor unit 24 having an arm 26 attached to a flapper valve member 28. Flapper valve member 28 is positioned between a pair of orifices 30 and 32 forming part of a member 34 which is pivotable around a stationary supporting member 36. A pair of conduits 38 and 40 communicate inlet conduit 12 with the orifices 30 and 32 through a conduit 42 and bleed 44 and a conduit 46 and bleed 48, respectively. A bellows member 50 provides a resilient communication between conduits 38 and 42 and a similar member 52 provides communication between conduits 46 and 40. Conduits 42 and 46 also communicate with a pair of bleeds 54 and 56 which provide a restriction between said conduits and a pair of conduits 58 and 60 communicating with opposite sides of piston 20 in chamber 22. Also positioned downstream of bleeds 54 and 56 are a pair of orifices 62 and 64 both of which communicate with the exhaust conduits 14. A flapper valve 66 forming part of member 34 is movable therewith to either decrease flow through orifice 62 and increase flow through orifice 64 or vice versa. This causes a pressure differential to occur on the opposite sides of piston 20, thereby causing said piston 20 and shaft 18 to be moved axially.

Also attached to shaft 18 is a piston 70 in a cylinder 72. Formed on the end of shaft 18 is a cam surface 74, and riding on this cam surface is a follower member 76 which is biased against said surface through the action of a spring 78. A lever 80 is attached to cam follower 76 and this lever carries a shaft 82 connected to the flapper member 28. A diaphragm 84 is fastened to housing 10 in such manner that one side of the diaphragm is in communication through a conduit 86 with the chamber on the lower side of piston 70 and the other side is in communication through a conduit 88 with the chamber on the upper side of piston 70 which is vented to the atmosphere. A small bleed 90 provides communication between the chambers on opposite sides of the diaphragm 84. Carried by the diaphragm 84 is a member 92 attached to the bottom end of lever 80 which is effective to transmit movements of the diaphragm 84 to the lever 80, thence to the shaft 82 and the flapper valve 28. The member 92 is suspended between a pair of springs 94 and 96.

In discussing the operation of the device of FIGURE 1 it will be assumed that the system is supplied with power from a source of high energy compressible fluid such as the high temperature products of combustion of a rocket engine and that control signals are supplied to the torque motor 24 from an external amplification source. In the absence of any signal, the flow will proceed from its source to inlet conduit 12 thence into conduits 42 and 46 where part of it flows through the bleeds 44 and 48 into conduits 38 and 40 to orifices 30 and 32 where it impinges upon the flapper member 28 and is exhausted to the atmosphere and part of the flow continues through the bleeds 54 and 56 into conduits 58 and 60 leading to the opposite sides of piston 20. Some of this latter flow will also be supplied to orifices 62 and 64 and this flow will impinge upon the second stage flapper member 66. In the absence of a control signal to the torque motor 24, the flapper valve 28 will normally be held centered in the position shown, and the pressure in both of lines 38 and 40 will be the same and hence the pressure inside of each of bellows members 50 and 52 will be the same. There will therefore be no rotation of the member 34 around its pivot point 36, hence no movement of second stage flapper member 66 and hence no pressure differential across piston 20.

Assume now that a signal is supplied to the torque motor which causes the arm 26 to rotate in a direction to move flapper valve 28 against the orifice 32 and away from the orifice 30. This will result in a pressure increase in line 40 and in the interior of bellows member 52 and a pressure decrease in line 38 and the interior of bellows 50. This will cause the pivotal member 34 to rotate around point 36 thereby moving the second stage flapper member 66 closer to the orifice 62 and removing it a greater distance from orifice 64. This causes an increase in the pressure in conduit 58 and an increase in pressure on the upper side of piston 20. There will also be a reduction in pressure in the conduit 60 and in the chamber in the lower side of piston 20 thereby causing said piston to be moved in a downward direction. As the piston 20 moves downward it carries shaft 18 and also the piston 70 and the cam surface 74 which presents a contour of increasing rise to the cam follower member 76. The movement of piston 70 in a downward direction also results in an increased pressure acting against the left side of diaphragm 84 thus causing a force to be transmitted through the member 92 to the lever 80 thence through shaft 82 to the flapper valve member 28. The cam surface 74 and follower 76 which act on lever 80 constitute a position feedback mechanism which tends to cause the flapper valve 28 to be returned to its null position as the shaft 18 is moved in either direction. Movement of the shaft downwardly will tend to cause the lever 80 to be rotated around its lower end thereby causing the flapper valve member to be moved away from orifice 32 and to stabilize the system again at a null position. Because of the bleed 90 across the diaphragm 84 there will always be a tendency for the pressures across piston 70 to equalize unless said piston is moving. When the piston is moving in a downward direction as described, the diaphragm 84 is moved to the right and the lever 80 will tend to be rotated around its top end and a force will be transmitted through the shaft 82 tending to move the flapper valve 28 away from the orifice 32. It is apparent that both of the feedback signals—that on follower member 76 and that from diaphragm 84—are acting in the same direction, but the magnitude of the pressure drop across diaphragm 84 varies with the rate of change of position of piston 70 and therefore this signal is a rate, rather than a position feedback signal. As soon as the flapper member 28 is returned to its null position as shown, there will be no further pressure differential in the interior of bellows members 50 and 52 and the flapper member 66 is also returned to its centered position and the pressure levels acting on each side of piston 20 are equalized. A signal supplied to the torque motor tending to move the flapper valve 28 against the orifice 30 will lead to the opposite result, member 34 being rotated in such manner as to cause flapper 66 to be moved against orifice 64, a pressure increase occurs in the chamber on the lower side of piston 20 which moves shaft 18 and piston 70 upwardly. The contour of the cam surface 74 is such that the follower member 76 is caused to move toward the left thereby pulling the flapper valve member 28 again toward its null position. The pressure change in the chamber below piston 70 will be such that the diaphragm 84 will be moved to the left which also produces a force tending to cause flapper valve 28 to move to the null position. This, of course, causes a gradual reduction in the pressure differential in bellows members 50 and 52 and member 34 is gradually rotated to its position as shown, the flow through orifices 62 and 64 is once again the same, the pressure differential across piston 20 is no longer present and the shaft 18 stops.

It is also possible that there will be, in the absence of a control signal from the torque motor 24, a change in the forces acting on shaft 18 which will tend to cause said shaft to be moved in one direction or the other. This movement is not desired, of course, and the system will immediately correct for such movement through the feedback system as described. Under such conditions, the flapper valve member 28 would be centered when the shaft 18 was moved, for example, in an upward direction. This will result in the follower member 76 being moved toward the left thereby pulling the flapper valve member 28 closer to the orifice 32 causing the member 34 to rotate in a direction to move flapper 66 against orifice 62 and causing an increase in the pressure on the top side of piston 20 which will oppose the force tending to move the piston 20 and the shaft 18 upwardly. The rate feedback system will also operate as described. Should the force acting on shaft 18 be very large, the resulting movement of piston 70 will initially be rather rapid and a substantial pressure differential will be developed almost immediately across the diaphragm 84. This, of course, will cause the previously described corrective signal to be supplied to the flapper valve member 28. The magnitude of this signal will be in substantially direct proportion to the rate at which the shaft 18 is moved.

Figure 2:
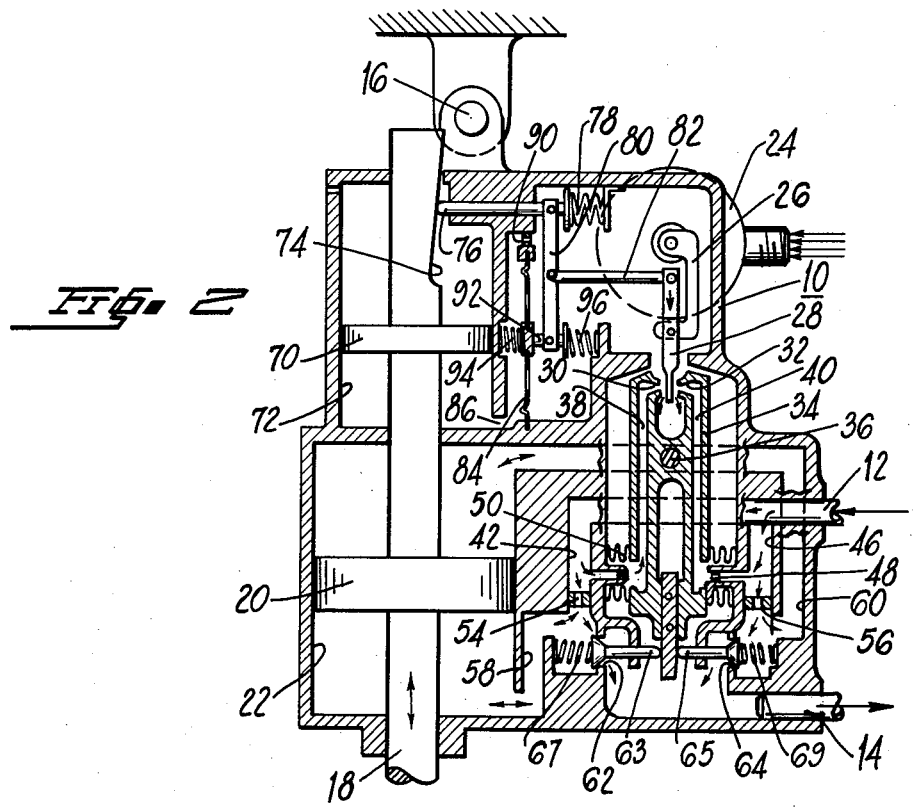
FIGURE 2 is a cross sectional view of a two-stage servomechanism similar to the device of FIGURE 1 but modified such that it is operable with a source of high energy compressible fluid which may be throttled.

The device shown in FIGURE 2 is very similar to that of FIGURE 1 with the exception that it is designed for use in a system wherein the flow of operating fluid may be controlled. Because of the great similarities in the two systems, identical numerals have been applied to similar components. It is contemplated that a device such as that shown in FIGURE 2 might be used with a system operated by means of a monopropellant such as hydrogen peroxide. In such a system, the liquid hydrogen peroxide is supplied to a gas generator and a regulator senses the pressure downstream from the gas generator and acts to control the flow of liquid hydrogen peroxide to the gas generator in response to changes in said sensed pressure. The consumption of propellant is dependent upon actual demand by the control system rather than upon the necessity for a continuous flow as in the system of FIGURE 1. The components of FIGURE 2 are essentially the same as those of FIGURE 1 with the exception that the flow through the second stage orifices 62 and 64 is controlled by means of valve members 63 and 65, respectively, biased in a closing direction by means of springs 67 and 69.

In operation this device works in the same manner as FIGURE 1 with respect to the first stage operation. Flow from inlet conduit 12 enters conduits 46 and 42, flows through bleeds 44 and 48 into conduits 38 and 40 where it passes through orifices 30 and 32 and impinges upon the flapper valve 28. As long as flapper valve 28 is held in the centered position as shown, there is no movement of the pivotal member 34. At the same time, there is flow through bleeds 54 and 56 and conduits 58 and 60 to the chambers on opposite sides of the power piston 20. Inasmuch as equal size orifices are used and the areas on the opposite sides of the piston 20 are the same, the effective pressures acting upon the piston 20 are equal and the piston 20 and shaft 18 are held stationary. Assume now a signal from the torque motor 24 which rotates arm 26 in a direction to pull the flapper valve 28 against the orifice 32. This will cause an increase in the pressure inside of the bellows member 52 and a drop in the pressure inside of bellows member 50 thus causing the member 34 to be rotated in a clockwise direction around its pivot 36 causing the second stage flapper member 66 to be moved toward the left end thereby pushing valve member 63 off its seat against the action of spring 67. This causes the pressure acting on the bottom side of the piston 20 to be exhausted out through the orifice 62 and the exhaust conduit 44 and permits the pressure acting on the upper side of piston 20 to begin moving piston 20 in a downward direction. As the shaft 18 moves downwardly along with piston 20 it also carries piston 70 and the contoured surface 74 which supply rate and position feedback means respectively for causing the flapper valve 20 to be moved to its null position in response to movement of the shaft 18. As in the case of the FIGURE 1 device, the diaphragm 84 responds to the rate of downward movement of piston 70 and communicates a force through member 92, lever 80 and shaft 82 to the flapper valve member 28. Should the flapper valve 28 be moved against the orifice 30, the member 34 will be rotated such that second stage flapper 66 will push valve member 65 off its seat thereby causing the pressure acting on the top side of the power piston 20 to be exhausted through conduit 60, orifice 64 and the exhaust conduit 40 and causing the pressure acting on the lower side of the piston to push the piston and the shaft 18 upwardly. In this device there will be a continuous flow through the first stage only and since this is a very limited flow there is a very small demand on the supply of hydrogen peroxide in the absence of a demand signal either from the torque motor or through the feedback signal reflecting an undesired movement of the shaft 18. It will be noted that the flapper member 66 is adjustable relative to member 34. This makes it possible to set the control for a plurality of possible response characteristics. The valves may be arranged to be moved with the slightest movement of flapper 66 or a desired amount of dead band may be incorporated by moving member 66 upward and increasing the clearance between flapper 66 and the valve members 63 and 65.

Figure 3:
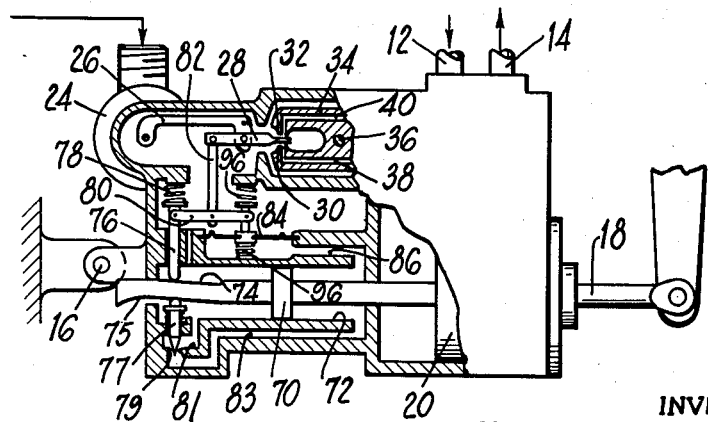
FIGURE 3 is a view, partly in section, of a mechanism having the features of the devices shown in either of FIGURES 1 or 2 and incorporating a variable rate feedback feature.

The device shown in FIGURE 3 is a view, partially in section, of a device having the characteristics of either FIGURE 1 or FIGURE 2 and incorporating a modified form of rate feedback. The components shown are essentially the same as those shown in FIGURES 1 and 2 and have been numbered accordingly with the exception of the rate feedback system which will now be described. The shaft 18 has, in addition to the position feedback cam contour 74 a second cam contour 75 which controls the axial position of a valve member 77 in an orifice 79. This valve is positioned between a conduit 81 communicating with the left side of piston 70 and a conduit 83 which communicates with the right hand side of piston 70 and with a conduit 86 communicating with the lower side of the diaphragm 84. As in FIGURES 1 and 2, the chamber corresponding to that on the left side of piston 70 is open to the atmosphere and therefore is not subject to appreciable pressure changes caused by movement of piston 70. The orifice 79 will be observed to have the same functional position in the circuit as the bleeds 90 shown in FIGURES 1 and 2 which bleeds provide a constant amount of rate feedback. In the device of FIGURE 3, the amount of rate feedback is variable with the particular instantaneous position of the shaft. With respect to the particular contour 75 shown on shaft 18 it will be observed that movement of the piston 70 and shaft 18 toward the left will cause the valve member 77 to be moved in a downward direction, thereby decreasing the effective area of the orifice 79. This effectively increases the amount of rate feedback as the piston nears the end of its stroke. Movement of the piston 70 and shaft 18 in the opposite direction will cause the area of the orifice 79 to be kept about the same until the piston nears the end of its stroke whereupon the valve member 77 will again be moved in a downward direction. This causes an increase in the pressure drop across the orifice 79 resulting in a decrease in the amount of fluid which can escape from the right hand side of the piston 70 thereby causing an increase in the pressure in the chamber on the right hand side of piston 70. This results in an upward movement of the diaphragm 84 and an effective increase in the rate signal as the piston 70 nears the right hand end of its stroke.

Although only a limited number of embodiments are shown and described herein, modifications may be made to suit the requirements of specific applications. While the operation has been explained in terms of pneumatic actuation, it will be apparent that the teachings herein may be incorporated into hydraulically actuated mechanisms.

We claim:

1. A two-stage servomechanism including a housing, an actuating shaft, a first cylinder and a piston movable in said cylinder and attached to said actuating shaft, a second cylinder and a second piston movable therein attached to said shaft, a source of high pressure fluid, an inlet conduit connecting said source to said housing, an outlet conduit for carrying exhaust flow from said housing, a member adapted for pivotal movement around a stationary point in said housing, a first pair of opposing orifices in said member connected with said inlet conduit, a flapper valve movable between said orifices, electro-responsive means for positioning said flapper valve, a pair of passages communicating said inlet conduit with opposite sides of said first piston, a second pair of orifices communicating said pair of passages with said outlet conduit, means responsive to movement of said member for varying the flow through said second orifices and hence, the pressure level acting on opposite sides of said piston, a cam surface formed on said shaft, a follower riding on said cam surface, a lever connected to said follower and means for transmitting movement of said lever to said flapper valve whereby movement of said shaft causes a movement varying with the position of said shaft to be transmitted to said flapper valve to cause said flapper valve to seek a null position, a pressure responsive member connected to the opposite end of said lever and communicating with said second cylinder on one side of said second piston, and a bleed providing restricted flow across said pressure responsive member.

2. A servomechanism as set forth in claim 1 wherein each of said second pair of orifices contains a valve member spring biased in a direction to close its respective orifice, and said flow varying means includes means attached to said member for opening one of said valves when said memebr is pivoted.

3. A servomechanism as set forth in claim 1 including a second cam surface formed on said shaft, and valve means movable in response to changes in the contour of said second cam surface for varying the effective area of said bleed.

4. A two-stage servomechanism including a housing, an actuating shaft, a cylinder and a piston movable in said cylinder and operably connected to said actuating shaft, a source of high pressure fluid, a pair of conduits communicating said source with said cylinder on opposite sides of said piston, an outlet conduit for carrying exhaust flow from said housing, a member adapted for pivotal movement around a stationary point in said housing, a first pair of opposing orifices in said member connected with said high fluid pressure source, a flapper valve movable between said orifices, electro-responsive means for positioning said flapper valve, means responsive to the pivotal movement of said member for varying the flow through said pair of conduits to vary the pressure level acting on opposite sides of said piston, a cam surface formed on said shaft, and means including a cam followed member for transmitting a position feedback signal varying with the position of said shaft to said flapper valve to cause said flapper valve to seek a null position.

5. A two-stage servomechanism including a housing, an inlet conduit for carrying fluid under pressure to said housing, an outlet conduit for carrying exhaust flow from said housing, a cylinder in said housing and a piston movable in said cylinder, a shaft connected to said piston and movable therewith, a pair of passages communicating said inlet conduit with opposite sides of said piston, a movable member in said housing and a pair of opposing orifices formed in said member communicating with said inlet conduit, a valve member movable between said orifices and control means for positioning said valve, said member being movable in response to a differential in the pressures upstream of said opposing orifices, and means responsive to the movement of said member for varying the flow through said pair of passages to vary the pressure level acting on opposite sides of said piston.

6. A servomechanism as set forth in claim 5 wherein feedback means are provided comprising a cam surface formed on said shaft, means including a cam follower member for transmitting a position feedback force to said flapper valve to cause said flapper valve to seek a null position, a fluid pressure responsive device connected to said flapper valve, a second cylinder in said housing and a piston in said cylinder connected to said shaft, a second cam surface on said shaft, a pressure responsive member connected to said flapper valve in communication with one side of said second piston, a conduit connecting said one side of said second piston with a low pressure source, and valve means in said conduit positioned wtih changes in the contour of said second cam surface as said shaft is translated.

7. A servomechanism as set forth in claim 5 wherein position feedback means are provided comprising a cam surface contoured on said shaft, a follower member movable with changes in the effective contour of said cam, a lever connected to said follower member, and means transmitting a force from said lever to said valve member tending to cause said valve member to seek a null position.

8. A servomechanism as set forth in claim 7 wherein rate feedback means are provided comprising a second cylinder in said housing and a second piston on said shaft dividing said cylinder into two chambers, means communicating one of said chambers with a low pressure source, pressure responsive means for sensing the instantaneous pressure in the other of said chambers connected to said lever, and a bleed providing restricted flow across said pressure responsive means.

9. A two-stage servomechanism including a housing, an inlet conduit for carrying fluid under pressure to said housing, an outlet conduit for carrying exhaust flow from said housing, movable wall means in said housing and force transmitting means operably connected to said movable wall means, a pair of passages communicating said inlet conduit with opposite sides of said movable wall means, a movable member in said housing and a pair of opposing orifices formed in said member communicating with said inlet conduit, a valve member movable between said orifices and control means for positioning said valve, said member being movable in response to a differential in the pressures upstream of said opposing orifices, and means responsive to the movement of said member for varying the flow through said pair of passages to vary the pressure level acting on opposite sides of said movable wall means.

10. A servomechanism as set forth in claim 9 wherein flow between said pair of passages and said outlet conduit is normally blocked by a valve member in each of said passages, and said last named means includes an actuating member for opening one of said valves when said member is moved in a first direction and for opening the other of said valves when said member is moved in the opposite direction.

11. A servomechanism as set forth in claim 9 wherein positional feedback means are provided comprising a cam surface movable with said force transmitting means, and means including a cam follower member for transmitting a position feedback signal to said valve member tending to cause said valve member to seek a null position.

12. A servomechanism as set forth in claim 9 wherein rate feedback means are provided including a second movable wall means movable with said force transmitting means, a chamber on each side of said second movable wall means, a fluid pressure responsive member responsive to the instantaneous pressure effective in one of said chambers, a bleed providing restricted flow across said pressure responsive member, and means connecting said pressure responsive member to said valve member.

References Cited in the file of this patent
UNITED STATES PATENTS

| | | |
|---|---|---|
| 2,600,777 | Johnson | June 17, 1952 |
| 2,641,227 | Jacques | June 9, 1953 |
| 2,767,689 | Moog | Oct. 23, 1956 |
| 2,886,010 | Hayos et al. | May 12, 1959 |